June 1, 1937.  C. W. BROWN  2,082,615
PANTOGRAPH
Filed May 13, 1933  3 Sheets-Sheet 3

Inventor
Charles W. Brown.
By Thomas A. Jenkins
Attorney

Patented June 1, 1937

2,082,615

UNITED STATES PATENT OFFICE 2,082,615

PANTOGRAPH

Charles W. Brown, Norwich, Conn., assignor to The United States Finishing Company, Providence, R. I., a corporation of Connecticut Application May 13, 1933, Serial No. 670,872

30 Claims. (Cl. 33—23)

My invention relates to improvements in pantographs.

An object of my invention is to provide in combination with a pantograph means to put the pantograph operator on a so called bonus system, in other words, to provide certain means to keep accurate check or register of the amount of work actually done on the pantograph. To this end I have provided in combination with the pantograph a counter which will indicate the number of depressions of the ordinary foot treadle thereof which operation brings the diamond means into engraving position with the cylinder to be engraved and is necessary in order to do any actual engraving on the cylinder. In use in the pantograph it is necessary to depress the foot treadle at the start of every new line whether the line be an outline or a ground line and I further provide in combination with the pantograph and preferably with said counter to note the number of depressions of the foot treadle a register which will register the unit movements of the two carriages normally included in the pantograph, which normally move at right angles to each other. While separate register means may be provided for each carriage, a further object of my invention is to provide an improved means which will register simultaneously the sums of the units of movements of each of the carriages. In investigating the devices possible to measure the actual linear distance traveled by the tracer point, there was found no suitable mechanical counter which would record continuously in one direction when the rotation of the driving shaft was reversed; such a counter might be possible but very expensive. It was also found practically impossible to provide a registering device which would follow the actual path of the tracer point. In the present construction of pantographs it is not practical to use any sort of friction device in contact with the zinc plates and it is very difficult to build a device which would exactly follow the tracer. I have discovered that some fixed relation exists between the distances traveled back and forth by the carriages and the actual length of the outline. In a pantograph there are two carriages which move in horizontal planes at right angles to each other, namely, a carriage which moves backwards and forwards in response to the back and forward movement of the tracer point, which in turn rotates the cylinder to be engraved so as to make up that component of the relative movement between the engraving diamond means and the cylinder and another carriage which moves laterally back and forth of the pantograph and of the cylinder being engraved. This latter carriage produces a lateral back and forth movement of the diamond means to provide the lateral component of movement of the tracer point. In order to prove that such a relationship between the back and forth movement of the carriages and the actual length of an outline existed, a number of outlines were carefully measured with a map measurer which records the actual length of the outline. The same outlines were traversed by hand in two directions at right angles to each other, thus representing the motions of the two carriages of the pantograph. The sum of the distances traversed in this manner was larger in every case than the actual perimeter of the object; but it was found that the total of the actual perimeters of a number of outline figures of irregular shapes bears an approximately constant ratio to the sum of the coordinate movements of the carriages which take place as the tracer point is traversed around the perimeters of the figures, provided that a reasonable number of differently shaped figures is included in the work traced. It is true that for each individual figure the ratio of the sum of the distances of the two carriages moving at right angles to each other varies, but that in textile designs very irregularly shaped figures, such as flowers, fruits, leaves, etc. are usually employed and in the course of a day's work a large number of these different figures are employed. While the ratio between the sum of the distances and the actual perimeter of the outline lines of these figures varies for each figure, the figures are of such generally irregular outline that for the purposes of the invention, namely, putting an operator on the bonus system they will give a sufficiently accurate enough ratio, which will be considerably better than what existed before, namely, no means at all for measuring the work done. In order to prevent the idle motion of the pantograph from being registered, that is, movements of the tracing member when the diamond means and the cylinder are not in operative engraving position, I therefore provide means to permit the register for the movement of the carriages to function only when the foot treadle is depressed by providing where an electrical register is provided a switch attached to the foot treadle in such a manner that no registration of the carriage movement register is possible unless the foot treadle is depressed. I then attached a contacting device to each carriage and caused the movement of each carriage for unit distance to cause an impulse to be sent to the electrical counter or register, this necessitated one counter for each carriage, however providing a device still within the broader features of my invention. In order to reduce the cost of constructing recorders it seemed desirable to arrange the device to record the motions of both carriages in one register. To accurately register impulses received in rapid succession so that the contacting device might cause an impulse for each, say, one-quarter inch travel for either carriage, I finally found a counter able to record as many as fifteen impulses per second made by the Veeder-Root Co. for which I do not believe a patent has yet issued.

To provide the desirable contactor I designed a contactor which provided for an impulse for each one-quarter inch travel of either carriage in either direction and further features of my invention relate to the specific form of contact forming means I employ preferably in combination with the other features of my invention employed in a pantograph which may be employed as a contact forming device in any type of linear measuring machine or other device, which will function if a single carriage moves alone, the other carriage moves alone, or both carriages move together so that it can still receive one impulse and record one unit in the counter for each one-quarter inch of motion of either carriage which takes place in the tracing operation. After the building and installation of this unit it was found that the units registered on the electrical counter together with the units registered on the foot treadle stroke counter would give an accurate measure of the work performed by the operator and there was found a substantially constant relation between the time required to perform a given task and the total units registered in the two counters regardless of the design being traced, that is, whether it consisted of small grounded areas or of large outlined areas and that in either case the time required per unit recorded was substantially the same. In order to test out the accuracy of my device I also did one roller over twice and found a substantial accord in the totals registered.

Further features of my invention relate to the improved means I employ for attaching my improved electrical contact device so as to be actuated respectively by the different carriages. I preferably employ steel tapes to operate the contact former so that the drag placed upon the machine by them is so slight as to be negligible. The electrical counter only consumes 5 watts of electrical energy in my preferred embodiment so that the contacts which open and close the circuit last a considerable length of time before requiring renewal or adjustment.

It is thus apparent that I have provided a device no matter how irregular the outline and ground lines are or how much each individual design requires back and forth movement of each carriage the total of movement of both in either direction may be actually registered.

While my improved invention is designed particularly for use in a pantograph, it is obvious that insofar as the novel features of the contact forming means and the actuating and register means employed in combination therewith are concerned that these may be employed in any type of a linear measuring apparatus and that the contact former may be employed in any type of a device where it is desired to register unit length movements, distance or time interval movements of various members and that I have provided a novel method of measuring the perimeter of a line which comprises forming electrical contacts or setting up signal indications in proportion to unit movements of length of members tracing said line in component planes at right angles to each other and registering the total of said signal indications to form a total substantially proportionate to the length of said line.

These and such other objects of my invention as may hereinafter appear will be best understood from a description of an embodiment thereof such as is illustrated in the accompanying drawings.

In the drawings, wherein like characters of reference indicate like parts throughout, 10 generally indicates a pantograph of standard construction. A zinc plate 12 with tracing lines already in it is adapted to be located on the tracing bed 14. The operative takes the tracing member 16 and first follows the outline lines on the zinc plate. The diamond means 18$^a$ and 18$^b$ are brought into operative engraving position with the rotating cylinder 20 by mechanism 22 acuated by the foot treadle 23. When said diamond means 18$^a$ and 18$^b$ are in operative engraving position with the cylinder 20 to be engraved, it is obvious that as the tracing point 16 is traced over the etching on the zinc plate 12 that the diamond means and cylinder 20 will be relatively moved to form a copy of the design on the printing roller and if a plurality of diamond points be employed, as are normally employed in a pantograph today a plurality of the designs traced will be engraved upon the printing roller 20 corresponding in number to the diamond points 18$^a$ and 18$^b$. If desired, as shown a pantograph may be employed which not only includes the diamond points 18$^a$ above the cylinder, but also includes the diamond points 18$^b$ below the cylinder. After the outline lines have been engraved in the usual manner, of course, if it is desired to have shade lines in the design, which are usually straight oblique lines, these may be readily traced from the zinc plate and engraved upon the cylinder in similar fashion as are the outline ilnes. In the usual pantograph, means are provided for transmitting the movement of said tracing member 16 to move said printing roller 20 and diamond means 18$^a$ and 18$^b$ to engrave said design onto the printing roller. In a pantograph said means includes a carriage 24 moved forward and backward in a horizontal plane for the forward and backward movement of said tracing member and a carriage 26 on which the tracing member 16 is mounted which moves laterally back and forth on said carriage 24 in a plane at right angles to the movement of said forward and backward movement of said carriage 24. Means are provided so that movement of the forward and backward carriage 24 will cause forward and backward movement of a slide 30 connected to said carriage 24 by suitable lever means 32. Forward and backward movement of the slide 30 rotates the friction roll 34 which in turn rotates the cylinder 20 backwards and forwards and in amounts proportionate to the back and forth movement of the backwardly and forwardly moving carriage 24. Means moved by said laterally moving carriage are provided to move said diamond means back and forth laterally in proportion to the back and forth lateral movement of said tracing member 16. Said means in my preferred embodiment comprises suitable toggle yoke means 36 which in turn actuates the sliding yoke means 38 to move the respective diamond holding means 18ª and 18ᵇ laterally relative to the movement of said laterally movable table 26. In the standard type of pantograph there is also provided a treadle 23 which actuates the links 22ª and 22ᵇ to bring the respective diamond means 18ª and 18ᵇ into operative engraving position with the rotatable roll 20. Thus when the treadle is depressed the link means 22ª operates to release the diamond means 18ª to drop onto the upper surface of the rotatable cylinder 20 and the link means 22ᵇ operates to raise the diamond means 18ᵇ to operate underneath the surface of the rotatable cylinder 20. The counter-weight 40 is provided so that when the foot is lifted from the treadle 23, the links 22ª and 22ᵇ will be returned to starting position to move the diamond means 18ª and 18ᵇ away from the printing cylinder 20 so that any careless movement of the tracing member 16 would not affect engraving on the printing cylinder 20, or when it is desired to remove the printing cylinder and replace it with another. So far I have described the operation of a standard type of pantograph which is on the market today.

Figure 1:
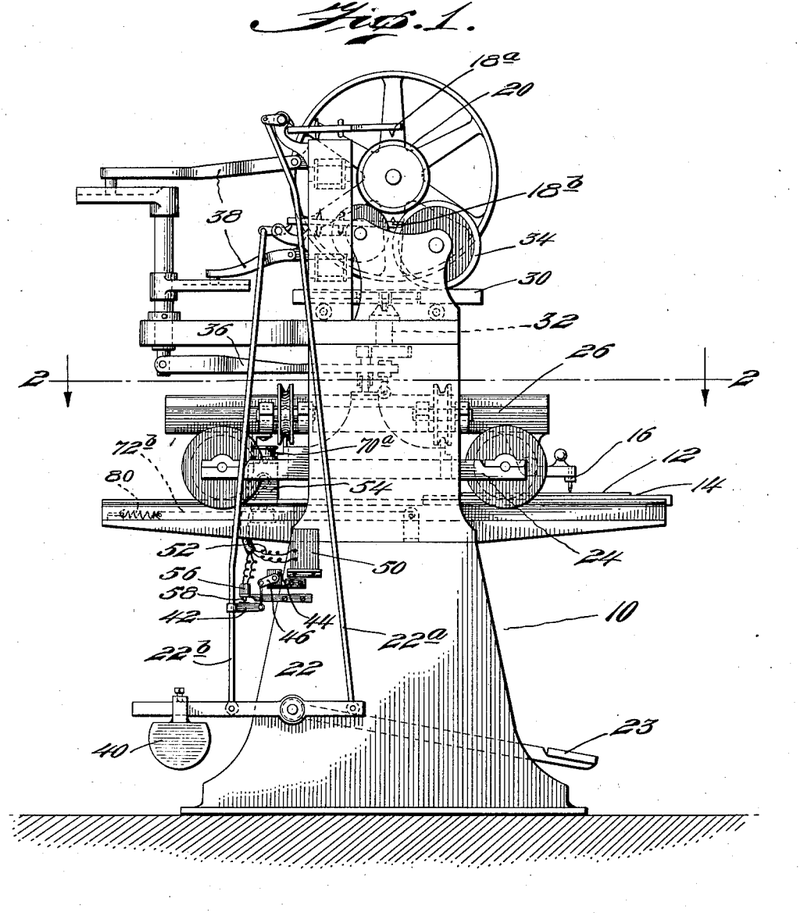
Fig. 1 is a side elevation of a standard type of textile printing cylinder engraving pantograph with my improved invention attached.
Figure 3:
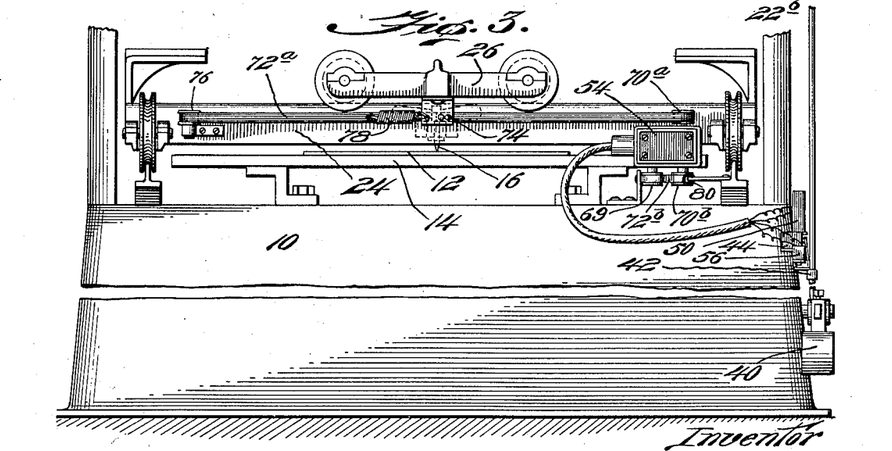
Fig. 3 is a rear elevation of the lower portion thereof.

As stated hitherto, my improved invention in its broadest aspect is to provide a method of and apparatus for measuring the perimeter or length of a line. While the elements of my device may be employed to measure the length of any line, it is particularly adapted to measure the length of the lines traced from the zinc plate or engraved on the copper roller 20 of a pantograph in order that the pantograph may be put on a time bonus system, the operator being paid in proportion to the amount of work done instead of being paid by the piece or by the day. Piece work has been unsatisfactory in pantographs as the designs vary so, both in length of lines and amount and number of ground lines. So far as I am aware I am the first to provide means to register the amount of work done on the pantograph in actually engraving a design. In the actual engraving in a pantograph as soon as either an outline or a ground line has been completed, it is necessary to move the tracing member 16 to a position to start a new line and of course this should be done without scratching any design on the printing roller and during the interval that the tracing member 16 is returned to another starting position, it is obvious that the diamond means 18ª and 18ᵇ where employed must be moved out of contact with the printing roller 20 and for this purpose the treadle operated device heretofore mentioned is usually employed. In order therefore to register the total number of lines actually traced by the pantograph operator I provide means for registering the number of treadle depressions, which of course, registers the number of lines started by the operator, whether they be outline or ground lines, for whenever a new line is started as hitherto explained the foot treadle is depressed to bring the diamond means 18ª and 18ᵇ into operative engraving position relative to the printing roller 20. Any suitable means to register the total number of depressions of the foot lever may be provided. In my preferred embodiment to the link means 22ᵇ for raising the lower diamond means 18ᵇ, I preferably attach an arm 42 and I provide a suitable standard type of mechanical counter 44 having an actuating lever 46 therefor suitably connected to the arm 42 so that every time the foot treadle 23 is depressed to start a new line the counter 44 will register another unit.

Figure 2:
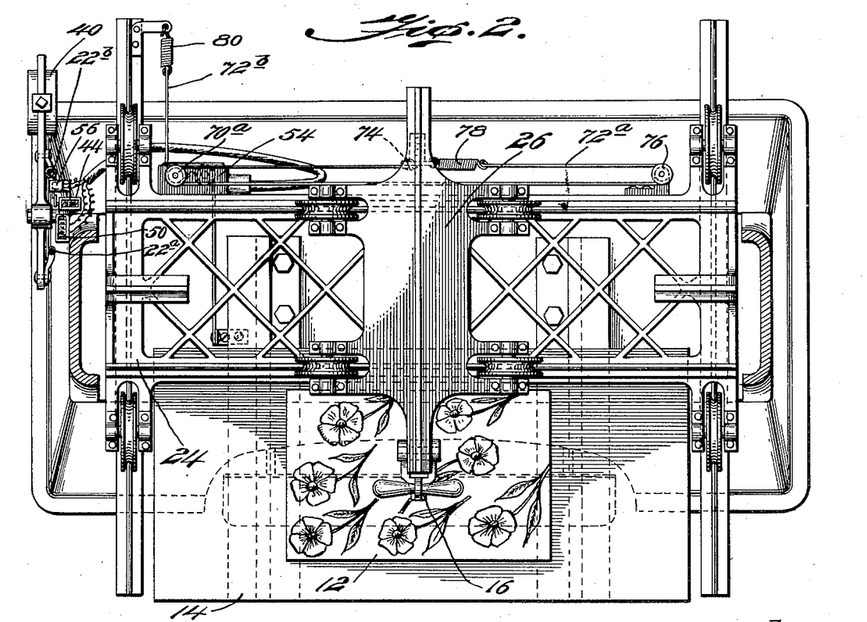
Fig. 2 is a plan view thereof taken along the line 2—2 of Fig. 1.
Figure 4:
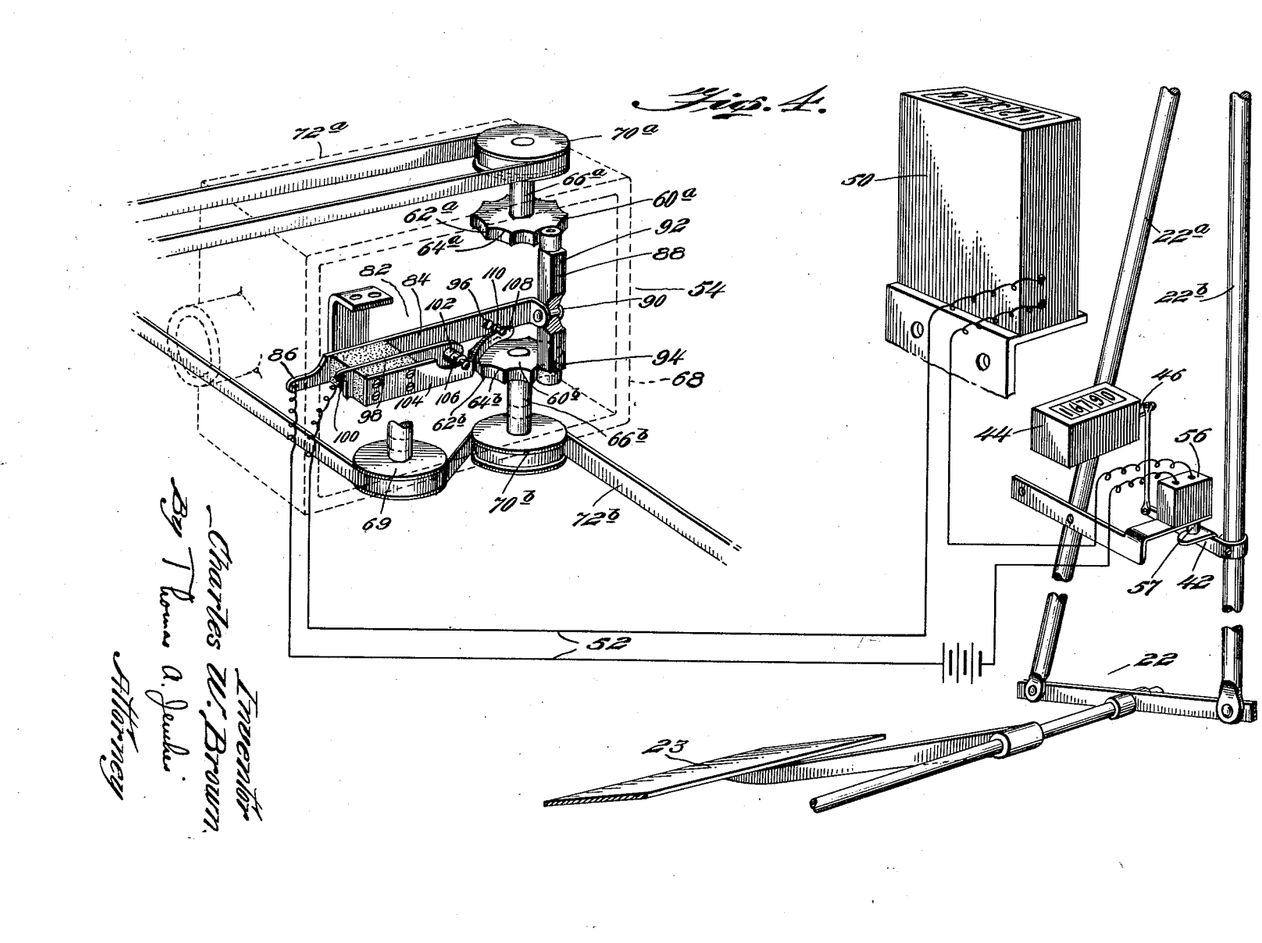
Fig. 4 is a diagrammatic view showing the actuating connections, mechanical parts and electric circuit of my improved contact formers and counters, the box for holding the contact formers being shown in dotted lines.

As stated hitherto both outline and ground lines are usually of irregular shape or of irregular length, depending on the nature of the design, and varying amounts of time, of course, will be consumed while tracing the length of the individual lines. I therefore provide a suitable type of counter mechanism 50 which will register figures in amounts relative to the length of the lines traced by the tracing point and engraved by the afore-described mechanism onto the printing roller. As stated hitherto, I have found by experiment that the sum of the back and forth movement of the respective carriages 24 and 26 moving at right angles (or 90°) to each other bears a proportionate relationship to the actual length of the irregular lines traced by the tracing member 16 and I believe that this relationship can be worked out mathematically. Therefore to get an approximation of the length of the lines actually traced by the operator, I measure the unit movements of the respective carriages 24 and 26 and add said units together to give a sum bearing a fixed relationship to the length of the lines actually traced by the pantograph.

In order that said counter mechanism 50 may only be actuated when the diamond means 18 is actually engraving on the printing roller 20 and not during the idle return motion of the tracing member 16, I preferably provide means to bring the register 50 only into actuation when said diamond means are so in contact, which in the operation of the pantograph described is only when the foot treadle is depressed to permit said engraving and I thus preferably provide means actuated by the treadle means to permit actuation of the register mechanism 50, registering in terms of the length of the lines traced, to be operative when the foot treadle is depressed to permit the actual engraving of lines on the printing cylinder 20 by means of the diamond means. In the improved type of registering mechanism shown I provide an electric register, inasmuch as this register must register in rapid succession the unit movements of the carriages 24 and 26 in each direction which are often quite small. As the design traced or amount moved by the tracing member in many instances is relatively small, it is necessary to provide an electric register which will register the contact in rapid succession and to this end I provide electrical registering mechanism capable of registering rapid contacts and have found an electric register manufactured by the Veeder-Root Co., on which so far as I am aware no patent has yet been granted, the most satisfactory. Said register mechanism in the embodiment shown in my invention is connected to the circuit 52, which in turn is connected to the contact forming means 54. As stated hitherto, it is only desirable in registering mechanism to register when the foot treadle 23 is depressed to bring the diamond means into operating engraving position with the cylinder 20 and for this purpose I provide the switch 56 in said circuit having a spring actuated member 57 depending therefrom adapted to be raised by the arm 42 connected to the raising link $22^b$ for the lower diamond points $18^b$ on depression of the foot treadle 23 to complete the circuit 52 so that contacts may be formed therein for registration of signalling indications on the electric register 50.

While any suitable type of make and break contact forming means may be employed, in the preferred embodiment of my invention, and as more particularly shown in Figs. 3 and 4, I provide a single contact forming means which may be actuated per unit movement of length of one carriage or the other to make or break the necessary contact to give the desired signal indications and which will also be actuated per unit movement of the other carriage and will transfer and send to the register the sum of make and/or break contacts formed by the sum total of unit movements of the respective carriages 24 and 26 and insofar as this feature of my invention is concerned it is obvious that I have additionally formed a novel specific type of contact former adapted for time interval or unit length signal forming means in an electric circuit. My improved contact forming means comprises the two oppositely disposed continuous circular cams $60^a$ and $60^b$ having the similar and similarly disposed parallel lobes $62^a$ and $62^b$ and intermediate therebetween corresponding cam depressions $64^a$ and $64^b$. I provide the shaft means $66^a$ and $66^b$ attached preferably to the center portion of said circular cam means $60^a$ and $60^b$ and adapted to project outwardly through the casing 68. In my preferred embodiment said cam means $60^a$ and $60^b$ are mounted one above each other in the contact box 68. A pulley $70^a$ is attached to the upper shaft means $66^a$ and a pulley $70^b$ is attached to the lower shaft means $66^b$. As shown more particularly in Fig. 2, suitable types of belt means contacting each of said pulleys $70^a$ and $70^b$ are provided which are connected to each of said carriages 24 and 26 to move therewith to rotate the pulleys $70^a$ and $70^b$ to rotate said cam means back and forth proportionate to the back and forth movement of said respective carriages 24 and 26. As shown more particularly in Fig. 2, the belt means $72^a$ has a point thereof 74 rigidly secured to said laterally movable carriage 26 and takes the form of a continuous belt which goes around the pulley $70^a$ and an idler pulley 76 spaced therefrom and mounted on said lower carriage 24. To insure that the belt $72^a$ will at all times drive the pulley $70^a$, spring means 78 is usually provided in said continuous belt $72^a$. I also provide belt means to rotate the lower pulley $70^b$ and hence cam $60^b$ in proportion to the backward and forward movement of the carriage 24. In this instance the belt means $72^b$ has one end thereof attached to a rear portion of the frame and the opposite end thereof attached to a front portion of the frame, one of said points of connection preferably being resilient as shown at 80 in Fig. 2 and passes around the driven pulley $70^b$ and an idler pulley 69. It is thus obvious that the cam $60^a$ will be rotated in amounts proportionate to the lateral movement of the carriage 26 and that the cam $60^b$ will be rotated in amounts proportionate to the forward and backward movement of the carriage 24, each movement being at approximately 90° or at right angles to each other.

As an additional feature of my improved contact former, I provide the leaf switch 82. Said switch includes a lower spring leaf 84 secured as at 86 to one portion of said electric circuit 52. A cross bar 88 is pivotally mounted as at 90 on the outer end of said lower spring leaf 84 and one end 92 of said bar is adapted to ride over the cam $60^a$ and the opposite end 94 is adapted to ride over the cam $60^b$. If desired each end may be provided with roller means for easy riding over said cam surfaces $60^a$ and $60^b$. The lower spring leaf 84 thus normally urges the ends 92 and 94 into contact with said respective cams $60^a$ and $60^b$.

For a purpose to be described I also provide a contact point 96 on the upper surface of said lower spring leaf 84. I also provide an intermediate spring leaf 98 insulatedly mounted above said lower spring leaf 84 and connected to said electric circuit 52 as at 100 and having a contact point 102 on the upper surface thereof. I additionally provide an upper spring leaf 104 insulatedly mounted over said intermediate spring leaf and having an inner contact point 106 on the lower surface thereof and the downwardly projecting outer end 108 having an outer contact point 110 on the lower surface thereof. The register 50 may be constructed to register either each make and break or on either the make or break formed in the circuit. It is obvious that when one end such as the end 92 of said cross bar 88 is raised by a cam lobe $62^a$ on the upper cam $60^a$ formed by unit movement of the carriage 26 back and forth in a lateral direction, that the end 92 will be raised the radial distance between the depression $64^a$ and the lobe $62^a$, and that the contact point 96 of said lower leaf switch 84 will be raised to form contact with said upper leaf contact point 110 to close the circuit 52, the cross bar 88 pivoting on a cam depression $64^b$ of the cam $60^b$ for this purpose. It is also obvious that when a lobe $62^b$ of said cam strikes the end 94 that the end 94 will be correspondingly raised, the opposite end 92 pivoting on a cam depression $64^a$ intermediate the lobes $62^a$ on the cam $60^a$. It is thus obvious that when either end 92 or 94 of said cross bar is raised that the center portion 90 will be raised approximately half the amount that the respective end thereof is raised and an amount sufficient to bring the contact point 96 on the lower spring leaf 84 into contact with the contact point 110 on the upper spring leaf 104. Assuming that the end 92 has been raised as at first explained by a cam lobe $62^a$ of the cam $60^a$, on the back and forward movement of the carriage 24, it is obvious that the end 94 will be raised upwards, the opposite end 92 pivoting on the cam lobe $62^a$ for this purpose to raise the pivot point 90 thereof an equal amount upwards as it was raised in the operation hitherto described. It is thus obvious that the lower spring leaf 84 contacting through the contacts 96 and 110 will raise the upper spring leaf further upwards to cause its inner contact point 106 to rise off the contact point 102 on the intermediate contact member 98, thereby setting up a signal indication by breaking the circuit 52 and thus sending another signal indication depending on how the register is constructed to said register when the similar cam lobes $62^a$ and $62^b$ operate simultaneously to raise up the transverse rod 88 a double amount. It is obvious that when the end 94 has been passed by a cam lobe $62^b$ and sinks in the cam depression $64^b$ on the cam $60^b$ that said end 94 will be correspondingly lowered to cause the upper spring leaf 104 to drop half the movement of the pivot point 90 of said transverse bar 88 upwards, thereby causing the lower contact 106 to again make contact with the contact 102 in the intermediate spring leaf 98, thus making another signalling indication to send to the register. It is then obvious that when the end 92 has been passed by the cam lobe 62a and sunk into a cam depression 64a that the pivot point 90 of said cross bar 88 will be further lowered and by the action of the lower leaf spring 84 will withdraw the contact point 96 thereof away from the contact point 110 of said upper spring leaf 104, thereby again breaking the circuit. There is thus formed in the passage of each respective end 92 and 94 of said transverse bar from adjacent cam depressions 64a and 64b of the cams 60a and 60b, a make and break in the circuit. The register 50 may be constructed to register on each make and/or break or on the make, or on the break and it is obvious that in each unit movement of length of either carriage there will be one make and one break imparted to the circuit. It is thus obvious that in my improved contact forming device the back and forward movement of the lower carriage 26 through the medium of the belt 72b and cam 60b thus forms a make and break for each unit movement of length thereof and that the lateral movement of the carriage 26 through the medium of the belt 72a and cam 60a one make and break in said circuit for each unit movement of length thereof. It is thus obvious that employing my improved contact former I am enabled to register the make and/or break for each unit movement of length of each respective carriage and that the total of the make and/or breaks sent to the registering mechanism will be in proportion to the sum of the unit movements of length of the respective carriages 24 and 26, which as I have hitherto stated bears a fixed proportionate relationship to the length of the ground and/or outline lines traced by the tracing member 16. It is obvious, however, that, insofar as certain features of my invention are concerned, the carriage 24 may be provided with a separate register from the carriage 26 and it will be necessary to add together when computing for bonus, or otherwise to measure the total length of the lines traced, the sum of the two respective counters. Employing my improved contact forming device, which as hitherto stated may be employed for other purposes, however, it is obvious that the single contact forming device indicates on a single register the sum of the unit movements of length of each of the respective carriages.

While my invention is peculiarly adapted for pantographs, it is obvious that it may be employed to measure the length of a line and I therefore for measuring the length of any line, set up signal indications or preferably form electrical contacts in proportion to the component unit movements of length at right angles to each other of the line measured and means for registering the total of said signal indications to form a total which is substantially proportionate to the length of said line and the combination of suitable means for this purpose. It is also apparent that although I preferably employ my invention in a pantograph, it may be employed in any type of a linear measuring instrument. As applied to a pantograph therefore, it is obvious that I have provided means to provide an excellent check on the amount of work done, by providing in combination means to register the total number of treadle depressions to indicate the number of lines started and means to measure the length or the perimeter of the actual engraved lines formed in making the design. It is apparent that insofar as the contact forming feature of my invention is concerned it may be employed for forming contacts responsive to time interval, linear distance, or otherwise.

It is understood that my invention is not limited to the specific embodiments shown and that various deviations may be made therefrom without departing from the spirit and scope of the appended claims.

What I claim is:

1. In a pantograph for tracing and engraving single or multiple copies of designs consisting of a plurality of different shaped outlines on to a cylindrical printing roller, a tracing bed for receiving the design, a tracing member adapted to be moved by the operative over the outline and/or ground lines of said design, a cylindrical printing roller, diamond means for engraving single or multiple copies of said design on to said cylindrical roller, and means for transmitting the movement of said tracing member to move said printing roller and diamond means to engrave said design onto said printing roller, including a carriage moved forward and backward in a horizontal plane by the forward and backward movement of said tracing member, means moved by said carriage to rotate said printing cylinder forwards and backwards in proportion to said movement of said tracing member, a carriage moved laterally back and forth in a horizontal plane by the lateral movement of said tracing member and means moved by said carriage to move said diamond means back and forth laterally in proportion to the back and forth lateral movement of said tracing member, treadle actuated means adapted on depression thereof to bring said diamond means into operative engraving relation with said cylinder, counter means for registering the number of treadle depressions to register the number of lines traced by said machine and counter means to register the sum of the individual back and forth movements of said forwardly and backwardly movable carriage and said laterally movable carriage to indicate a total varying generally in proportion to the total of the lengths of said outline and/or ground lines operable only if said treadle actuated means is actuated to bring said diamond means into operative relation with said cylinder for the actual engraving of designs.

2. In a pantograph for tracing and engraving single or multiple copies of designs consisting of a plurality of different shaped outlines onto a cylindrical printing roller, a tracing bed for receiving the design, a tracing member adapted to be moved by the operative over the outline and/or ground lines of said design, a cylindrical printing roller, diamond means for engraving single or multiple copies of said design onto said cylindrical roller, and means for transmitting the movement of said tracing member to move said printing roller and diamond means to engrave said design onto said printing roller, including a carriage moved forward and backward in a horizontal plane by the forward and backward movement of said tracing member, means moved by said carriage to rotate said printing cylinder forwards and backwards in proportion to said movement of said tracing member, a carriage moved laterally back and forth in a horizontal plane by the lateral movement of said tracing member and means moved by said carriage to move said diamond means back and forth laterally in proportion to the back and forth lateral movement of said tracing member, treadle actuated means adapted on depression thereof to bring said diamond means into operative engraving relation with said cylinder and counter means to register the sum of the individual back and forth movements of said forwardly and backwardly movable carriage and said laterally movable carriage to indicate a total varying generally in proportion to the total of the lengths of said outline and/or ground lines.

3. In a pantograph for tracing and engraving single or multiple copies of designs consisting of a plurality of different shaped outlines onto a cylindrical printing roller, a tracing bed for receiving the design, a tracing member adapted to be moved by the operative over the outline and/or ground lines of said design, a cylindrical printing roller, diamond means for engraving single or multiple copies of said design onto said cylindrical roller, and means for transmitting the movement of said tracing member to move said printing roller and diamond means to engrave said design onto said printing roller, including a carriage moved forward and backward in a horizontal plane by the forward and backward movement of said tracing member, means moved by said carriage to rotate said printing cylinder forwards and backwards in proportion to said movement of said tracing member, a carriage moved laterally back and forth in a horizontal plane by the lateral movement of said tracing member and means moved by said carriage to move said diamond means back and forth laterally in proportion to the back and forth lateral movement of said tracing member, treadle actuated means adapted on depression thereof to bring said diamond means into operative engraving relation with said cylinder, contact forming means, means operated by each of said carriages to actuate said contact forming means to form contacts relative to unit movements of length of either carriage in either direction, an electrical contact register means actuated by said contact forming means to indicate the sum of the corresponding movements of said tracing member in either direction.

4. In a pantograph for tracing and engraving single or multiple copies of designs consisting of a plurality of different shaped outlines onto a cylindrical printing roller, a tracing bed for receiving the design, a tracing member adapted to be moved by the operative over the outline and/or ground lines of said design, a cylindrical printing roller, diamond means for engraving single or multiple copies of said design onto said cylindrical roller, and means for transmitting the movement of said tracing member to move said printing roller and diamond means to engrave said design onto said printing roller, including a carriage moved forward and backward in a horizontal plane by the forward and backward movement of said tracing member, means moved by said carriage to rotate said printing cylinder forwards and backwards in proportion to said movement of said tracing member, a carriage moved laterally back and forth in a horizontal plane by the lateral movement of said tracing member and means moved by said carriage to move said diamond means back and forth laterally in proportion to the back and forth lateral movement of said tracing member, treadle actuated means adapted on depression thereof to bring said diamond means into operative engraving relation with said cylinder, counter means for registering the number of treadle depressions to register the number of lines traced by said machine, contact forming means, means operated by each of said carriages to actuate said contact forming means to form contacts relative to unit movements of length of either carriage in either direction, electrical contact register means actuated by said contact forming means to indicate the sum of the corresponding movements of said tracing member in either direction, said contact forming means and register means being operable only if said treadle actuated means is actuated to bring said diamond means into operative relation with said cylinder for the actual engraving of designs.

5. In combination, an electric circuit, an electric switch mounted on a machine and connected to said circuit, means to contact said switch to close said circuit for registering purposes, contact forming means connected to said circuit comprising two oppositely disposed continuous circular cam means having similar and similarly disposed parallel lobes and intermediate cam depressions, shaft means connected to each of said cam means, pulley means mounted on each of said shaft means, a leaf switch comprising a lower spring leaf secured to one portion of said circuit and having a cross bar secured transversely to the end thereof having roller means on the ends thereof urged into said cam depressions by said leaf spring and a contact point on the upper surface thereof, an intermediate leaf insulatedly mounted above said lower spring leaf connected to said circuit and having a contact point on the upper surface thereof and an upper spring leaf insulatedly mounted over said intermediate leaf connected to said circuit and having an inner contact point on the lower surface thereof and a downwardly projecting outer end having an outer contact point on the lower surface thereof, whereby when one end of said cross bar is raised by a cam lobe the center point thereof attached to said lower leaf is raised to raise the contact point of said lower leaf to form contact with said upper spring leaf contact point to close the circuit and when the opposite end of said cross bar is raised simultaneously by a cam lobe of the opposite cam the center portion thereof attached to said lower spring leaf is further raised to raise said upper leaf spring contact point off contact with said intermediate leaf contact to break the circuit, and said upper spring leaf is correspondingly lowered to form contact with said intermediate leaf contact when one end of said bar has passed its respective cam lobe and said lower spring is further lowered to break contact with said upper leaf spring when the opposite end of said bar has simultaneously passed its cam lobe.

6. Contact forming means adapted to be connected to a circuit for signalling purposes comprising two oppositely disposed continuous circular cam means having similar and similarly disposed parallel lobes and intermediate cam depressions, shaft means connected to each of said cam means, pulley means mounted on each of said shaft means, a leaf switch comprising a lower spring leaf adapted to be secured to one portion of a circuit and having a cross bar secured transversely to the end thereof having roller means on the ends thereof urged into said cam depressions by said leaf spring and a contact point on the upper surface thereof, an intermediate leaf insulatedly mounted above said lower spring leaf adapted to be connected to said circuit and having a contact point on the upper surface thereof and an upper spring leaf insulatedly mounted over said intermediate leaf adapted to be connected to said circuit and having an inner contact point on the lower surface thereof and a downwardly projecting outer end having an outer contact point on the lower surface thereof, whereby when one end of said cross bar is raised by a cam lobe the center point thereof attached to said lower leaf is raised to raise the contact point of said lower leaf to form contact with said upper spring leaf contact point to close the circuit and when the opposite end of said cross bar is raised simultaneously by a cam lobe of the opposite cam the center portion thereof attached to said lower spring leaf is further raised to raise said upper leaf spring contact point off contact with said intermediate leaf contact to break the circuit, and said upper spring leaf is correspondingly lowered to form contact with said intermediate leaf contact when one end of said bar has passed its respective cam lobe and said lower spring is further lowered to break contact with said upper leaf spring when the opposite end of said bar has simultaneously passed its cam lobe.

7. Contact forming means adapted to be connected to a circuit for signalling purposes comprising two continuous circular cam means having similar and similarly disposed parallel lobes and intermediate cam depressions, shaft means connected to each of said cam means, pulley means mounted on each of said shaft means, a leaf switch comprising a lower spring leaf adapted to be secured to one portion of a circuit and having a cross bar secured transversely to the end thereof urged into said cam depressions by said leaf spring and a contact point on the upper surface thereof, an intermediate leaf insulatedly mounted above said lower spring leaf adapted to be connected to said circuit and having a contact point on the upper surface thereof and an upper spring leaf insulatedly mounted over said intermediate leaf adapted to be connected to said circuit and having an inner contact point on the lower surface thereof and a downwardly projecting outer end having an outer contact point on the lower surface thereof, whereby when one end of said cross bar is raised by a cam lobe, the center point thereof attached to said lower leaf to form contact with said upper spring leaf contact point to close the circuit and when the opposite end of said cross bar is raised simultaneously by a cam lobe of the opposite cam, the center portion thereof attached to said lower spring leaf is further raised to raise said upper leaf spring contact point off contact with said intermediate leaf contact to break the circuit and said upper spring leaf is correspondingly lowered to form contact with said intermediate leaf contact when one end of said bar has passed its respective cam lobe and said lower spring is further lowered to break contact with said upper leaf spring when the opposite end of said bar has simultaneously passed its cam lobe.

8. In a pantograph for tracing and engraving single or multiple copies of designs consisting of a plurality of different shaped outlines onto a cylindrical printing roller, a tracing bed for receiving the design, a tracing member adapted to be moved by the operative over the outline and/or ground lines of said design, a cylindrical printing roller, diamond means for engraving single or multiple copies of said design onto said cylindrical roller and means for transmitting the movement of said tracing member to move said printing roller and diamond means to engrave said design onto said printing roller, including a carriage moved forward and backward in a horizontal plane by the forward and backward movement of said tracing member, means moved by said carriage to rotate said printing cylinder forwards and backwards in proportion to said movement of said tracing member, a carriage moved laterally back and forth in a horizontal plane by the lateral movement of said tracing member and means moved by said carriage to move said diamond means back and forth laterally in proportion to the back and forth lateral movement of said tracing member, pivotally mounted treadle means and link means connecting said treadle means to said diamond means to bring said diamond means into operative engraving relation with said printing cylinder on depression of said treadle means, counter means mounted on said pantograph including an actuating lever connected to said link means for registering the number of treadle means depressions to register the number of lines traced by said machine, an electric circuit, an electric switch mounted on said machine and connected to said circuit, means carried by said link means to contact said switch to close said circuit on depression of said foot treadle, an electric register connected to said circuit, contact forming means adapted to make and/or break a contact in said circuit in response to unit movements of length of one of said carriages and contact forming means adapted to make and/or break a contact in said circuit in response to unit movements of length of the other of said carriages, whereby said register may register the total contacts formed by said contact forming means to indicate a total varying generally in proportion to the total of the lengths of said outline and/or ground lines.

9. In a pantograph for tracing and engraving single or multiple copies of designs consisting of a plurality of different shaped outlines onto a cylindrical printing roller, a tracing bed for receiving the design, a tracing member adapted to be moved by the operative over the outline and/or ground lines of said design, a cylindrical printing roller, diamond means for engraving single or multiple copies of said design onto said cylindrical roller and means for transmitting the movement of said tracing member to move said printing roller, including a carriage moved forward and backward in a horizontal plane by the forward and backward movement of said tracing member, means moved by said carriage to rotate said printing cylinder forwards and backwards in proportion to said movement of said tracing member, a carriage moved laterally back and forth in a horizontal plane by the lateral movement of said tracing member and means moved by said carriage to move said diamond means back and forth laterally in proportion to the back and forth lateral movement of said tracing member, means to bring said diamond means into operative engraving relation with said printing cylinder, an electric circuit, an electric register connected to said circuit, contact forming means adapted to make or break a contact in said circuit in response to unit movements of length of one of said carriages and contact forming means adapted to make or break a contact in said circuit in response to unit movements of length of the other of said carriages, whereby said register may register the total contacts formed by said contact forming means to indicate a total varying generally in proportion to the total of the lengths of said outline and/or ground lines.

10. In a pantograph for tracing and engraving single or multiple copies of designs consisting of a plurality of different shaped outlines onto a cylindrical printing roller, a tracing bed for receiving the design, a tracing member adapted to be moved by the operative over the outline and/or ground lines of said design, a cylindrical printing roller, diamond means for engraving single or multiple copies of said design onto said cylindrical roller and means for transmitting the movement of said tracing member to move said printing roller and diamond means to engrave said design onto said printing roller, including a carriage moved forward and backward in a horizontal plane by the forward and backward movement of said tracing member, means moved by said carriage to rotate said printing cylinder forwards and backward in proportion to said movement of said tracing member, a carriage moved laterally back and forth in a horizontal plane by the lateral movement of said tracing member and means moved by said carriage to move said diamond means back and forth laterally in proportion to the back and forth lateral movement of said tracing member, pivotally mounted treadle means and link means connecting said treadle means to said diamond means to bring said diamond means into operative engraving relation with said printing cylinder on depression of said treadle means, counter means mounted on said pantograph including an actuating lever connected to said link means for registering the number of treadle means depressions to register the number of lines traced by said machine, an electric circuit, an electric switch mounted on said machine and connected to said circuit, means carried by said link means to contact said switch to close said circuit on depression of said foot treadle, an electric register connected to said circuit and contact forming means adapted to make or break a contact in said circuit in response to unit movements of length of both of said carriages, whereby said register may register the total contacts formed by said contact forming means to indicate a total varying generally in proportion to the total of the lengths of said outline and/or ground lines.

11. In a pantograph for tracing and engraving single or multiple copies of designs consisting of a plurality of different shaped outlines onto a cylindrical printing roller, a tracing bed for receiving the design, a tracing member adapted to be moved by the operative over the outline and/or ground lines of said design, a cylindrical printing roller, diamond means for engraving single or multiple copies of said design onto said cylindrical roller and means for transmitting the movement of said tracing member to move said printing roller and diamond means to engrave said design onto said printing roller, including a carriage moved forward and backward in a horizontal plane by the forward and backward movement of said tracing member, means moved by said carriage to rotate said printing cylinder forwards and backwards in proportion to said movement of said tracing member, a carriage moved laterally back and forth in a horizontal plane by the lateral movement of said tracing member and means moved by said carriage to move said diamond means back and forth laterally in proportion to the back and forth lateral movement of said tracing member, means to bring said diamond means into operative engraving relation with said printing cylinder, an electric circuit, an electric register connected to said circuit, contact forming means adapted to make or break a contact in said circuit in response to unit movements of length of one of said carriages and contact forming means adapted to make or break a contact in said circuit in response to unit movements of length of the other of said carriages, whereby said register may register the total contacts formed by said contact forming means to indicate a total varying generally in proportion to the total of the lengths of said outline and/or ground lines.

12. In a pantograph for tracing and engraving single or multiple copies of designs consisting of a plurality of different shaped outlines onto a cylindrical printing roller, a tracing bed for receiving the design, a tracing member adapted to be moved by the operative over the outline and/or ground lines of said design, a cylindrical printing roller, diamond means for engraving single or multiple copies of said design onto said cylindrical roller and means for transmitting the movement of said tracing member to move said printing roller and diamond means to engrave said design onto said printing roller, including a carriage moved forward and backward in a horizontal plane by the forward and backward movement of said tracing member, means moved by said carriage to rotate said printing cylinder forwards and backwards in proportion to said movement of said tracing member, a carriage moved laterally back and forth in a horizontal plane by the lateral movement of said tracing member and means moved by said carriage to move said diamond means back and forth laterally in proportion to the back and forth lateral movement of said tracing member, means to bring said diamond means into operative engraving relation with said printing cylinder, an electric circuit, an electric register connected to said circuit and contact forming means adapted to make or break a contact in said circuit in response to unit movements of length of both of said carriages, whereby said register may register the total contacts formed by said contact forming means to indicate a total, varying generally in proportion to the total of the lengths of said outline and/or ground lines.

13. In combination, an electric circuit, contact forming means adapted to make and/or break a contact in said circuit in response to back and forth movements of a movable member and contact forming means adapted to make and/or break a contact in said circuit in response to back and forth movements of another movable member movable at right angles to said first member and an electric register connected to said circuit adapted to register the total makes and/or breaks in said circuit to indicate the total back and forth movements of said members.

14. In combination, an electric circuit, contact forming means adapted to make and/or break contacts in said circuit in response to back and forth movements of a plurality of movable members and an electric register connected to said circuit adapted to register the total makes and/or breaks in said circuit to indicate the total back and forth movements of said members.

15. In combination, an electric circuit, contact forming means adapted to make and/or break contacts in said circuit in response to back and forth movements of two movable members movable at right angles to each other and an electric register connected to said circuit adapted to register the total makes and/or breaks in said circuit to indicate the total back and forth movements of said members.

16. In combination, an electric circuit, contact forming means adapted to make and/or break a contact in said circuit in response to movements of a plurality of movable members and electric register means connected to said circuit adapted to register the total makes and/or breaks in said circuit to indicate the total movements of said members.

17. In combination, an electric circuit, contact forming means adapted to make and/or break a contact in said circuit in response to movements of two movable members movable at right angles to each other and electric register means connected to said circuit adapted to register the total makes and/or breaks in said circuit to indicate the total movement of said members.

18. In combination, an electric circuit, contact forming means adapted to make and/or break a contact in said circuit in response to movements of a movable member and contact forming means adapted to make and/or break a contact in said circuit in response to movements of another movable member and an electric register connected to said circuit adapted to register the total makes and/or breaks in said circuit to indicate the total movement of said members.

19. In combination, an electric circuit, contact forming means adapted to make and/or break a contact in said circuit in response to back and forth movements of a movable member and contact forming means adapted to make and/or break a contact in said circuit in response to back and forth movements of another movable member movable at right angles to the movement of said first movable member and an electric register connected to said circuit adapted to register the total makes and/or breaks in said circuit to indicate the total back and forth movements of said members.

20. In a linear measuring apparatus, a tracing member, means to resolve the back and forth movement of said member into component movements at right angles to each other, means to form signal indications varying proportionately to the length of said movements back and forth and single means to register the total of said signal indications.

21. In a linear measuring apparatus, a tracing member, means to resolve the back and forth movement of said member into component movements at right angles to each other, means to form signal indications varying proportionately to the length of said movements back and forth and means to register the total of said signal indications.

22. In a linear measuring apparatus, a tracing member, electrical means to form interruptions in an electrical circuit proportionate to the back and forth component movements of said member at right angles to each other and single means to register the total of said electrical interruptions to indicate the length of the line traversed.

23. In a linear measuring apparatus, a tracing member, means to form interruptions in an electrical circuit proportionate to the back and forth component movements of said member at right angles to each other and means to register the total of said electrical interruptions to indicate the length of the line traced.

24. In a linear measuring apparatus, a tracing member, means to form interruptions in an electrical circuit proportionate to the back and forth component movements of said member and means to register the total of said electrical interruptions to indicate the length of the line traced.

25. In a pantograph, a tracing member, two carriages each movable at right angles to each other in response to the amount of back and forth movement of said tracing member, means to translate irregular movements of said tracing member into component movements of said carriages, means to set up signal indications proportionate to the amount of back or forth movements of each of said carriages and single means to indicate the total of said signal indications.

26. In a pantograph, a tracing member, two carriages each movable in response to the amount of back and forth movement of said tracing member at right angles to each other, means to translate irregular movements of said tracing member into component movements of said carriages, means to set up signal indications proportionate to the amount of back or forth movement of each of said carriages and means to indicate the signal indications.

27. In a pantograph, a tracing member, two carriages each movable in response to the amount of back and forth movement of said tracing member at right angles to each other, means to set up signal indications proportionate to the amount of back or forth movement of each of said carriages and single means to indicate the total of said signal indications.

28. In a pantograph, a tracing member, two carriages each movable in response to the amount of back and forth movement of said tracing member at right angles to each other, means to set up signal indications proportionate to the amount of back or forth movements of each of said carriages and means to indicate the signal indications.

29. An indicator for pantographic engraving machines comprising in combination, a pantograph carriage movable in any direction, engraving points controlled thereby, means to move said points into and out of operative position, and an indicator operated by movement of said carriage limited distances in any direction, said indicator being so connected to said means as to be operated only when said points are in operative position.

30. An indicator for pantographic engraving machines comprising in combination, a pantograph carriage, engraving points controlled thereby, means to move said points into and out of operative position, a contactor movable with said carriage and alternately closing and opening an electric circuit, during said movement, a switch in said circuit closed when said engraving points are in operative position, and an indicator connected in said circuit and operated with each closing of the circuit by said contactor when said switch is closed.

CHARLES W. BROWN.